(12) United States Patent
Topping et al.

(10) Patent No.: US 8,911,650 B2
(45) Date of Patent: Dec. 16, 2014

(54) METHOD OF MANUFACTURING A COMPOSITE ELEMENT

(75) Inventors: Simon W Topping, Bristol (GB);
Martin Edwards, Bristol (GB); Risto Kallinen, Bristol (GB); Nils Haack, Bristol (GB)

(73) Assignee: Airbus Operations Limited, Bristol (GB)

( * ) Notice: Subject to any disclaimer, the term of this patent is extended or adjusted under 35 U.S.C. 154(b) by 821 days.

(21) Appl. No.: 13/054,185

(22) PCT Filed: Jul. 27, 2009

(86) PCT No.: PCT/GB2009/050900
§ 371 (c)(1),
(2), (4) Date: Jan. 14, 2011

(87) PCT Pub. No.: WO2010/013029
PCT Pub. Date: Feb. 4, 2010

(65) Prior Publication Data
US 2011/0121487 A1    May 26, 2011

(30) Foreign Application Priority Data
Jul. 29, 2008   (GB) .................................. 0813785.3

(51) Int. Cl.
*B29C 70/48*   (2006.01)
*B29C 70/54*   (2006.01)
*B29L 31/00*   (2006.01)
*B29B 11/16*   (2006.01)

(52) U.S. Cl.
CPC ............... *B29C 70/543* (2013.01); *B29C 70/48* (2013.01); *B29L 2031/003* (2013.01); *B29B 11/16* (2013.01)

USPC ........................... 264/258; 264/257; 264/296

(58) Field of Classification Search
None
See application file for complete search history.

(56) References Cited

U.S. PATENT DOCUMENTS 4,683,018 A * 7/1987 Sutcliffe et al. ............... 156/196
5,364,258 A   11/1994 Buckley et al.
(Continued)

FOREIGN PATENT DOCUMENTS

EP   0603066   6/1994
EP   1393875   3/2004
(Continued)

OTHER PUBLICATIONS

Hexcel, Advanced Fibre-Reinforced Matrix Products for Direct Processes, Mar. 9, 2013.*
(Continued)

*Primary Examiner* — Benjamin Schiffman
(74) *Attorney, Agent, or Firm* — Lowe Hauptman & Ham, LLP

(57) ABSTRACT

A method of manufacturing a composite element. A stack of plies is assembled on a lay-up table, each ply comprising a plurality of reinforcement elements such as dry-fibers. A first part of the stack of plies is bound to form a partially bound stack of plies, a second part of the stack of plies remaining unbound. The partially bound stack of plies is press-formed in a mold cavity between a pair of mold tools to form a shaped pre-form, plies in the second part of the stack sliding against each other during the press-forming. A liquid matrix material is injected into the shaped pre-form in the mold cavity and subsequently cured.

13 Claims, 22 Drawing Sheets

(56) References Cited

U.S. PATENT DOCUMENTS

| | | | | |
|---|---|---|---|---|
| 5,431,870 | A * | 7/1995 | Andre | 264/103 |
| 5,538,589 | A * | 7/1996 | Jensen et al. | 156/581 |
| 5,567,509 | A * | 10/1996 | Gautier | 428/36.1 |
| 6,814,916 | B2 * | 11/2004 | Willden et al. | 264/257 |
| 8,142,181 | B2 * | 3/2012 | Willden et al. | 425/416 |
| 2004/0023581 | A1 * | 2/2004 | Bersuch et al. | 442/149 |
| 2004/0043196 | A1 * | 3/2004 | Willden et al. | 428/174 |
| 2005/0053762 | A1 * | 3/2005 | Willden et al. | 428/122 |
| 2006/0172636 | A1 * | 8/2006 | Bech | 442/1 |
| 2007/0175573 | A1 | 8/2007 | Fox et al. | |
| 2007/0251641 | A1 | 11/2007 | Santos Gomez et al. | |
| 2009/0035517 | A1 * | 2/2009 | Bech | 428/138 |
| 2009/0317585 | A1 * | 12/2009 | Bech | 428/113 |

FOREIGN PATENT DOCUMENTS

| | | |
|---|---|---|
| EP | 1749631 | 2/2007 |
| GB | 2168002 | 6/1986 |
| GB | 2244453 | 12/1991 |
| IT | TO2008232 | 6/2008 |
| JP | 2006-142819 A | 6/2006 |
| JP | 2006-256202 A | 9/2006 |
| RU | 1837012 A1 | 8/1993 |
| RU | 2116887 C1 | 8/1998 |
| SU | 1316840 A1 | 6/1987 |
| WO | 9606726 | 3/1996 |
| WO | 2004078443 | 9/2004 |

OTHER PUBLICATIONS

UK Search Report for Application No. GB0813785.3 mailed Nov. 24, 2008.
UK Search Report for Application No. GB0813785.3 mailed Dec. 9, 2008.
International Search Report for PCT/GB2009/050900 mailed Jun. 14, 2010.
Russian Office Action dated Oct. 24, 2013, for corresponding RU Application No. 2011105092/05(007214).
Partial Translation of Japanese Office Action dated Nov. 12, 2013, for corresponding JP Application No. 2011-520591.

* cited by examiner

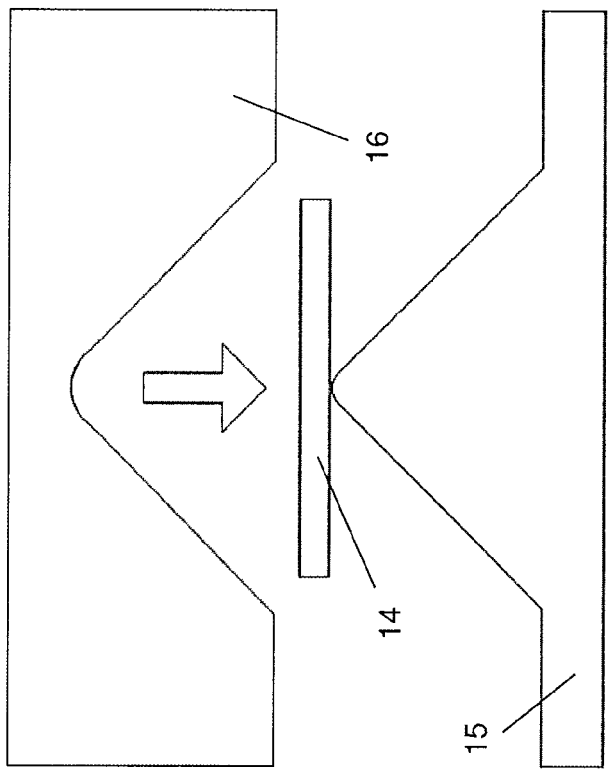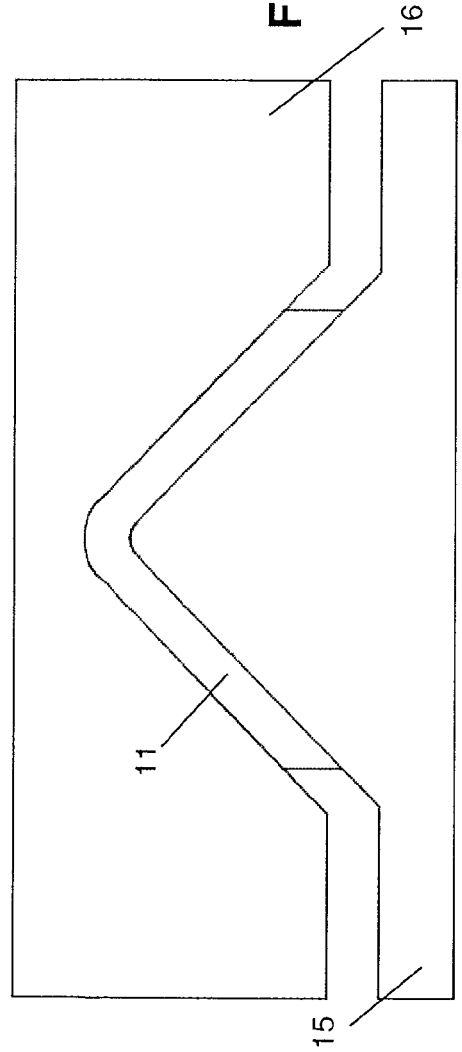

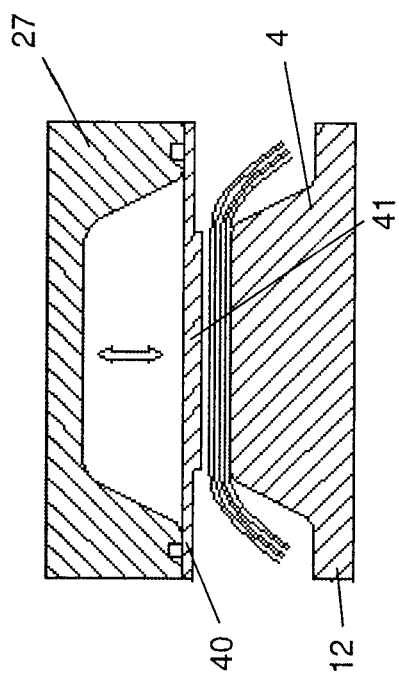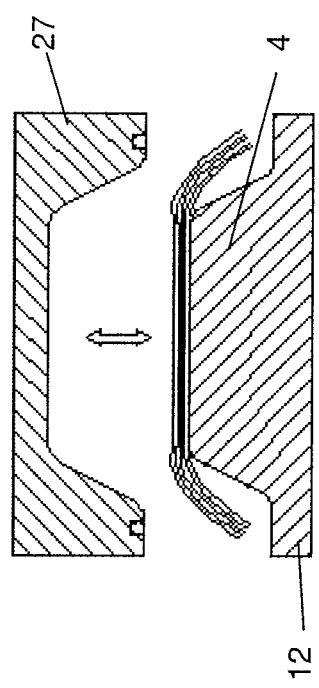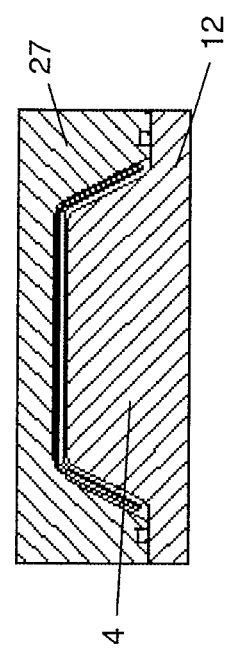

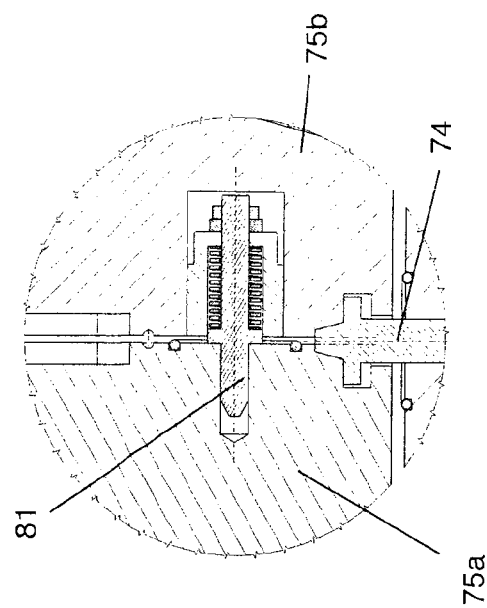
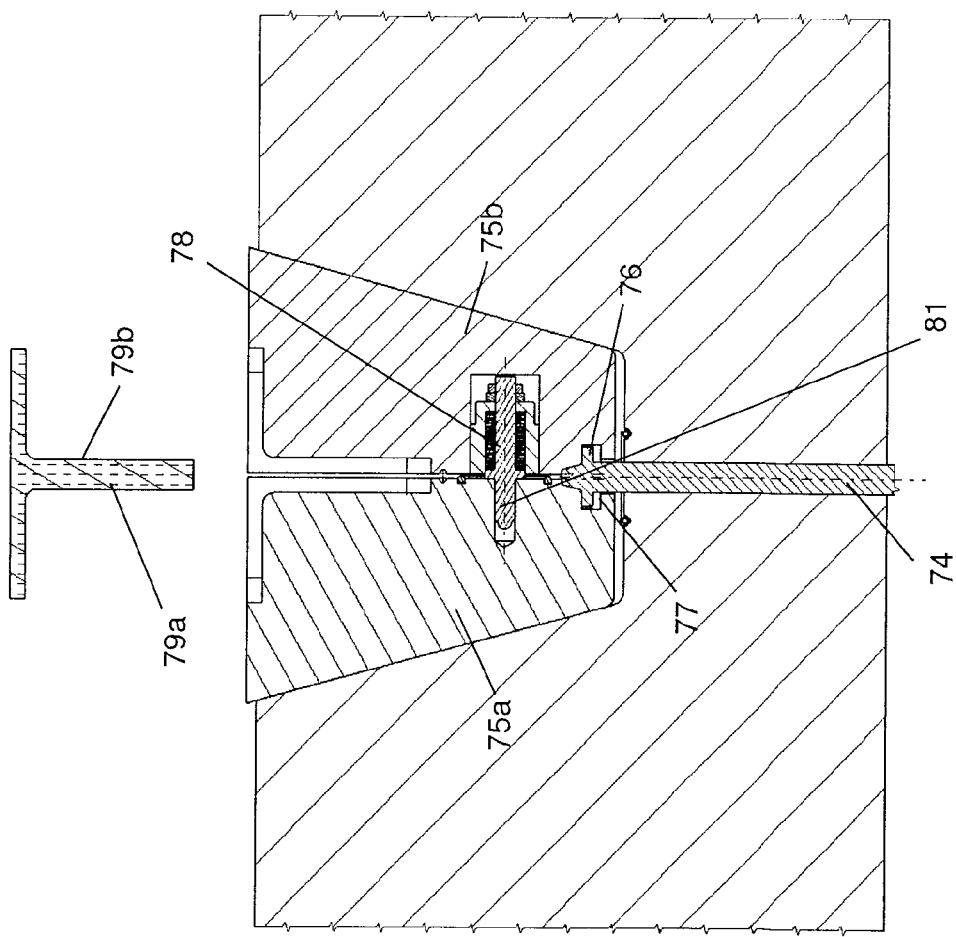

METHOD OF MANUFACTURING A COMPOSITE ELEMENT

RELATED APPLICATIONS

The present application is a national phase of PCT/GB2009/050900, filed on Jul. 22, 2009 and is based on, and claims priority from, Great Britain Application Number 0813785.3, filed Jul. 29, 2008.

FIELD OF THE INVENTION

The present invention relates to a method of manufacturing a composite element.

BACKGROUND OF THE INVENTION

Current state of the art composite large aircraft wing spars are typically manufactured from prepreg materials with Automated Tape Laying (ATL) and then hot formed to the desired shape over a male mandrel. The spar is then cured either on a male tool or in a female tool. Prepreg manufacture requires the use of an autoclave, which is a large capital investment. Also, the ATL process is only able to build a relatively simple structure with small thickness variations, simple pad-ups and shallow ramps, and any folding lines being more or less straight. More complex geometries and fibre architectures require the prepreg to be laid manually or with the use of fibre placement.

An alternative process for manufacturing a composite component is so-called Resin Transfer Moulding (RTM) in which dry fibre is infused with liquid resin between a rigid male and female mould tool. Conventionally, where a complex geometry is required, then the dry fibre is laid by hand into the female mould tool. This manual lay-up process is laborious and time consuming.

SUMMARY OF THE INVENTION

A first aspect of the invention provides a method of manufacturing a composite element, the method comprising:
a. assembling a stack of plies on a lay-up table, each ply comprising a plurality of reinforcement elements;
b. binding together a first part of the stack of plies to form a partially bound stack of plies, a second part of the stack of plies remaining unbound;
c. press-forming the partially bound stack of plies in a mould cavity between a pair of mould tools to form a shaped pre-form, plies in the second part of the stack sliding against each other during the press-forming;
d. injecting a liquid matrix material into the shaped pre-form in the mould cavity; and
e. curing the liquid matrix material.

Assembling the plies on a lay-up table instead of one of the mould tools makes it easier to assemble the stack by an automated method, because the lay-up table can have a relatively simple shape (for instance it can be substantially flat).

By allowing the plies in some but not all parts of the stack to slide against each other during press-forming, wrinkling of plies is avoided or at least mitigated.

The matrix material may comprise a thermoplastic material (in which case the matrix material cools during the curing step e.). Alternatively the matrix material may comprise a two-part chemical system which cures due to a chemical reaction (such as a polymerisation). More preferably the matrix material is a thermosetting material such as an epoxy resin, polyester resin, phenolic resin, vinyl ester resin or bis-maleimide (BMI) resin.

Typically the reinforcement elements are fibres such as glass or carbon fibres. Each ply in the stack may comprise a series of unidirectional fibres, a non-crimped fabric, or any other suitable fibre construction.

The binding step b. may comprise heating the first part of the stack of plies to melt a binder. The binder may be interspersed within the stack before it is melted, or may be provided as a separate layer which impregnates the stack as it melts. Alternatively the stack may be bound by stitching together the plies in the first part of the stack, or any other suitable binding method which prevents the plies from sliding against each other during the press-forming step.

The binding step b. typically comprises applying pressure to the selected part of the stack of plies. This pressure may be applied by one of the mould tools which is subsequently used in the press-forming step c, by a caul plate under a vacuum bag, or by any other suitable pressing device.

The binding step b. may be performed with the stack of plies on the lay-up table, or the stack of plies may be removed from the lay-up table before binding.

Preferably the method comprises placing an additional component between two or more cassette parts to form a cassette; inserting the cassette into a recess in one of the tools; injecting a liquid matrix material into the additional component in the recess; and curing the liquid matrix material in the additional component. In the embodiments described below the composite element is an aircraft spar and the additional components are rib posts. However the method may be used to form another composite element such as wing or fuselage skin and in this case the additional components may be for example stringers for stiffening the skin.

Typically the cassette is ejected from the recess as the pre-form is disengaged from the one of the tools after curing, for instance by a ram housed in the base of the recess. The ram can thus provide the necessary force to disengage the pre-form from the tool without requiring any manual intervention.

Typically the additional component is compressed between the cassette parts in order to de-bulk the additional component. The cassette parts may be forced together by any suitable means, but preferably the recess is a tapered recess which forces the cassette parts together as they are inserted into the recess. The ram which pushes the cassette parts to eject them from the recess may also pull them into the recess to force them together. A biasing member such as a spring may also be provided to urge the cassette parts apart from each other.

A second aspect of the invention provides apparatus for manufacturing a composite element, the apparatus comprising: a lay-up table; a pair of mould tools for press-forming a partially bound stack of plies in a mould cavity between the pair of mould tools to form a shaped pre-form; and an injection port for injecting a liquid matrix material into the shaped pre-form in the mould cavity.

Various preferred aspects of the invention are set out in the dependent claims.

BRIEF DESCRIPTION OF THE DRAWINGS

Embodiments of the invention will now be described with reference to the accompanying drawings, in which:

FIGS. 7a and 7b show the press-forming of an L-shaped rib post half;

FIGS. 23-25 are sectional views showing an alternative method of binding and shaping a stack;

FIGS. 30a and b are sectional views through the male tool and cassette with the cassette lifted up slightly;

DETAILED DESCRIPTION OF EMBODIMENT(S)

A method of manufacturing a composite rear spar is shown in FIGS. 1 to 22. In a first step shown in FIG. 1, a stack 1 of dry-fibre plies is assembled on a lay-up table 2. Each ply comprises a 12K High Tensile Strength (HTS) Advanced Unidirectional Weave (AUW) 285 g/m$^2$ with EPR05311 binder. More specifically, each ply comprises a layer of carbon fibres extending in one direction, woven in a weaving loom with glass fibres extending at right angles to the carbon fibres. EPR05311 is provided as a powdered material by Hexion Specialty Chemicals. The powder is applied to the top of the weave and melted with an infrared lamp to form small droplets.

The stack is assembled manually ply by ply with assistance from a laser projector. Another option would be using robots with vacuum grippers to pick up the plies from a cutter and lay them up. The periphery of each individual ply is cut into a desired shape by an ultrasonic knife before the ply is laid onto the lay-up table. Location holes 36 (shown in FIG. 15) and datum pin holes 28 (shown in FIG. 17) are also cut into each ply before the ply is laid up. A third option would be to use a system which runs on top of the lay-up table and cuts each ply into shape as the material is unloaded from a roll.

Figure 1:
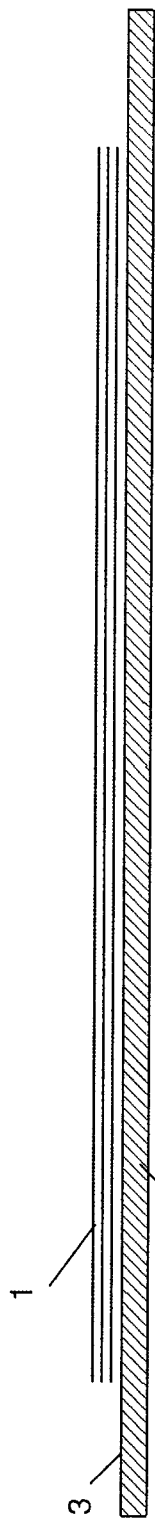
FIG. 1 is a sectional view through a lay-up table carrying a dry fibre stack.

Although the table 2 is only shown in cross-section in FIG. 1, it should be noted that the upper surface 3 of the table on which the stack is laid is substantially horizontal and planar.

Figure 2:
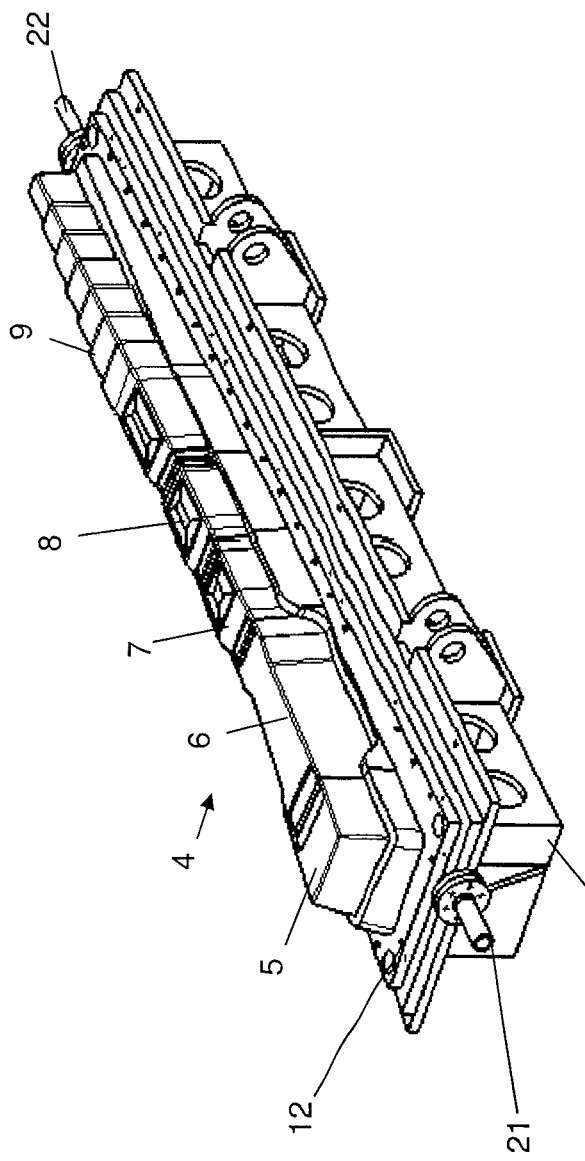
FIG. 2 is a perspective view of a male tool, base plate and support frame.

FIG. 2 shows a male forming tool 4, base plate 12 and support frame 13. The male forming tool 4 comprises a series of five separate mandrels 5-9 which are each individually bolted to the base plate 12. The support frame 13 has a pair of axles 21,22 which are pivotally mounted onto a pair of A-frames 23, 24 shown in FIG. 3 after the mandrels have been bolted to the base plate. A transport trolley 25 is wheeled underneath the support frame 13 and jacked up to lift the weight off the A-frames 23, 24.

Figure 4:
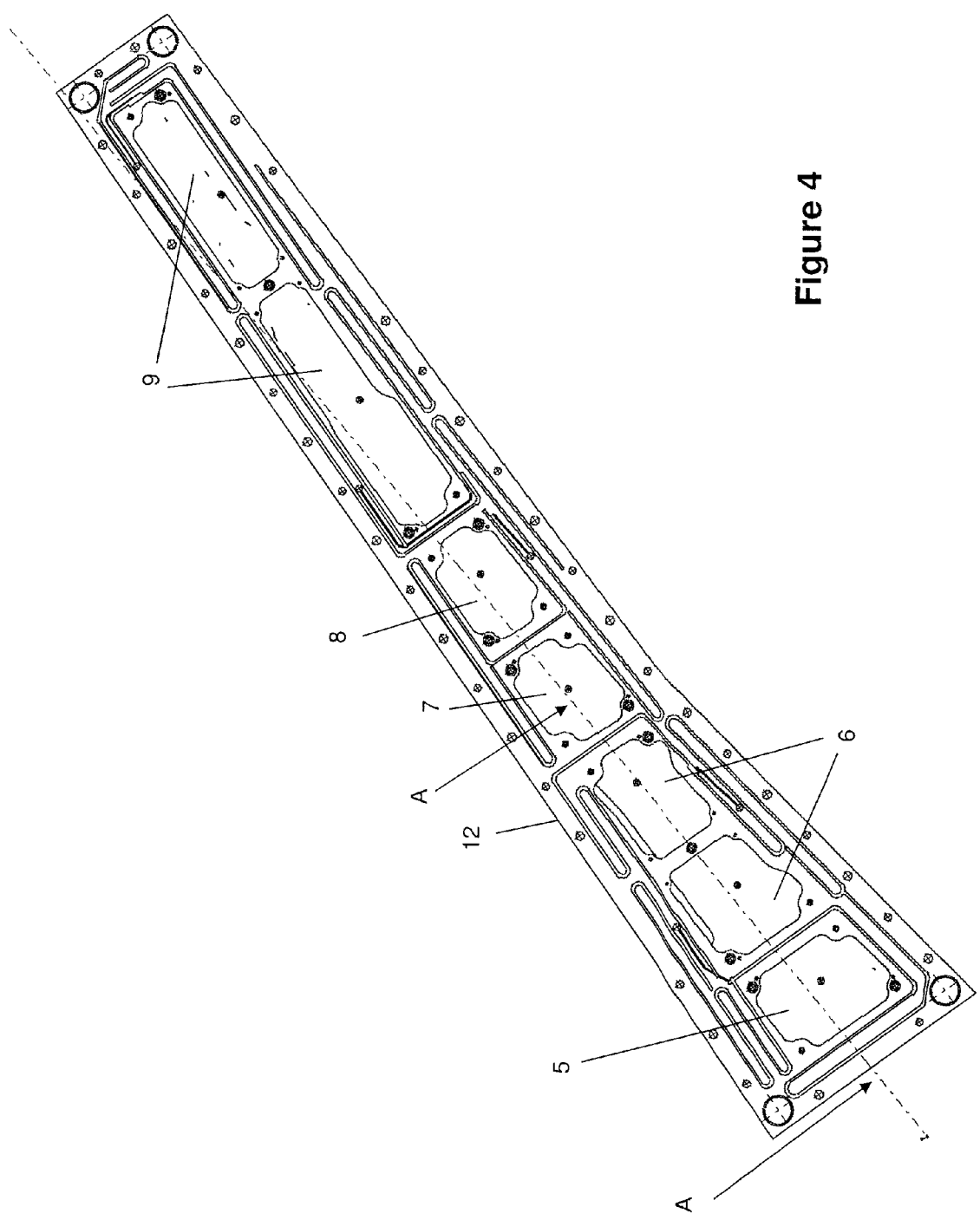
FIG. 4 shows the underside of the base plate and male tool.
Figure 6:
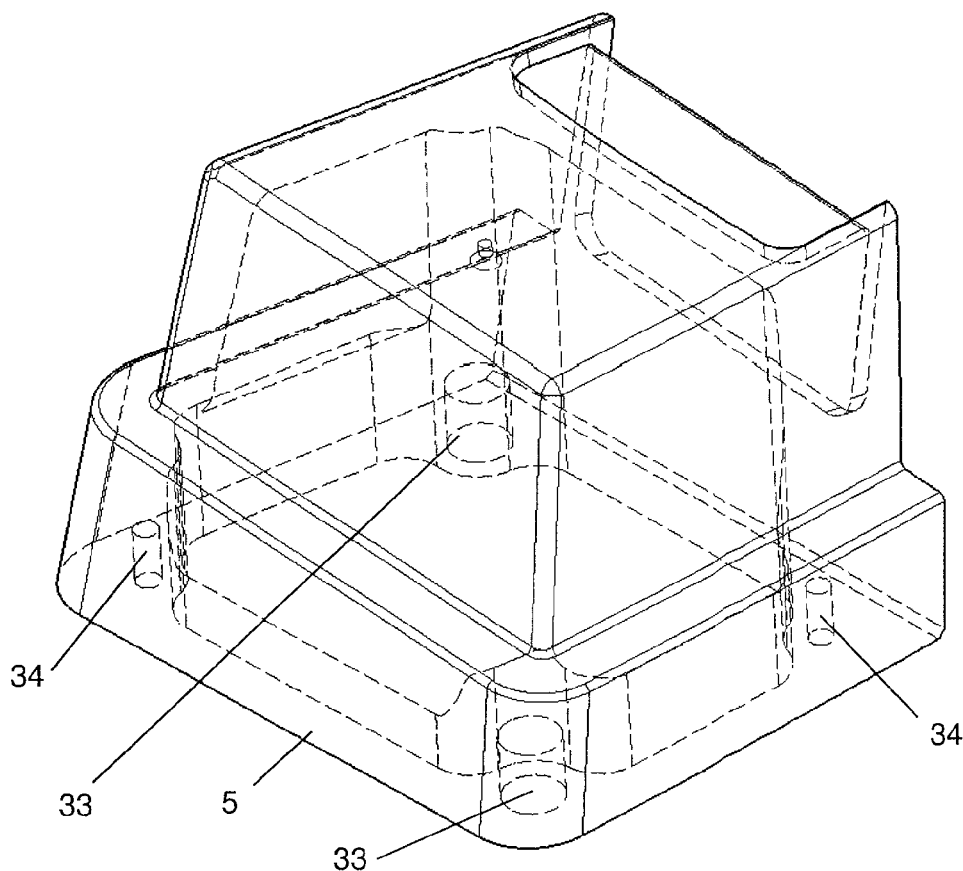
FIG. 6 shows one of the mandrels.
Figure 5:
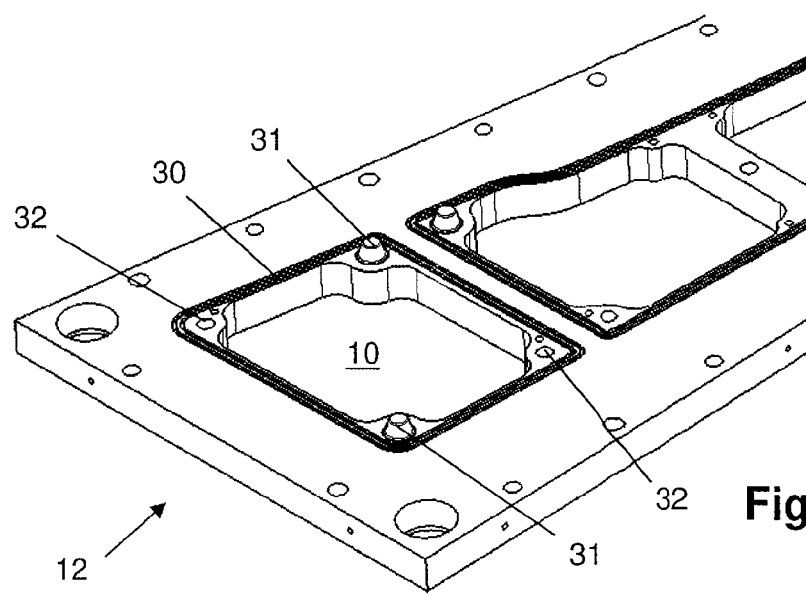
FIG. 5 shows one end of the base plate.

FIG. 4 shows the underside of the base plate 12 and male forming tool. The base plate has a series of seven holes through which the mandrels 5-9 can be seen in FIG. 4. FIG. 5 shows the upper side of one end of the base plate 12 including one of the holes 10. Surrounding the hole 10 is a seal groove 30, a pair of conical pins 31 and a pair of fastener holes 32. The mandrel 5 is shown in FIG. 6, with hidden details shown in dashed line. When the mandrel 5 is fitted to the base plate 12, the conical pins 31 locate in holes 33 in the underside of the mandrel, and fasteners (not shown) are screwed into threaded holes 34 in the underside of the mandrel 5 to secure it to the base plate. The other mandrels 6-9 are fitted to the base plate in a similar manner.

Figure 3:
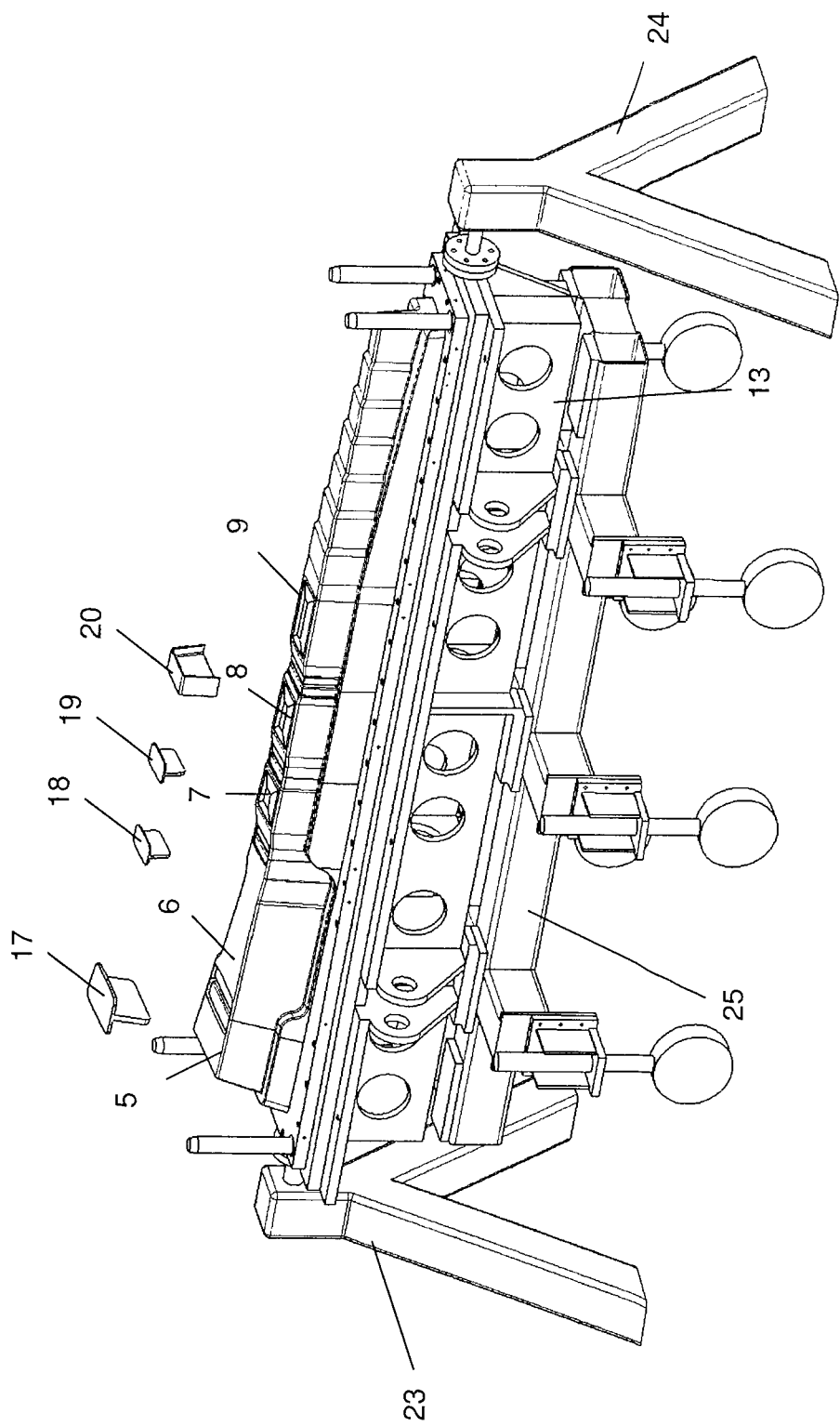
FIG. 3 is an exploded view showing the rib posts.

FIGS. 7a and 7b show the press-forming of half of a rib post. A planar dry-fibre stack 14 is press formed between a male tool 15 and a female tool 16 to form an L-shaped pre-form 11. Next, the pre-form 11 is cut to the desired shape with a cutting tool. One of such pre-forms 11 is placed on the end mandrel 5 after the mandrel 5 has been secured to the base plate. Then a second pre-form 11 is placed on the mandrel 6, and the mandrel 6 is attached to the base plate so that the pre-forms 11 lie back to back to form a T-shaped rib post 17 shown in FIG. 3. The remaining mandrels 7-9 and their associated rib-post halves are then installed in a similar manner. Three T-shaped rib posts are indicated at 17-19 in FIG. 3. A fourth rib post 20 with a different shape is also shown in FIG. 3.

Noodle fillers (not shown) are then manually assembled onto the rib posts 17-20 and secured in place by locally heating the binder in the dry-fibre.

Figure 8:
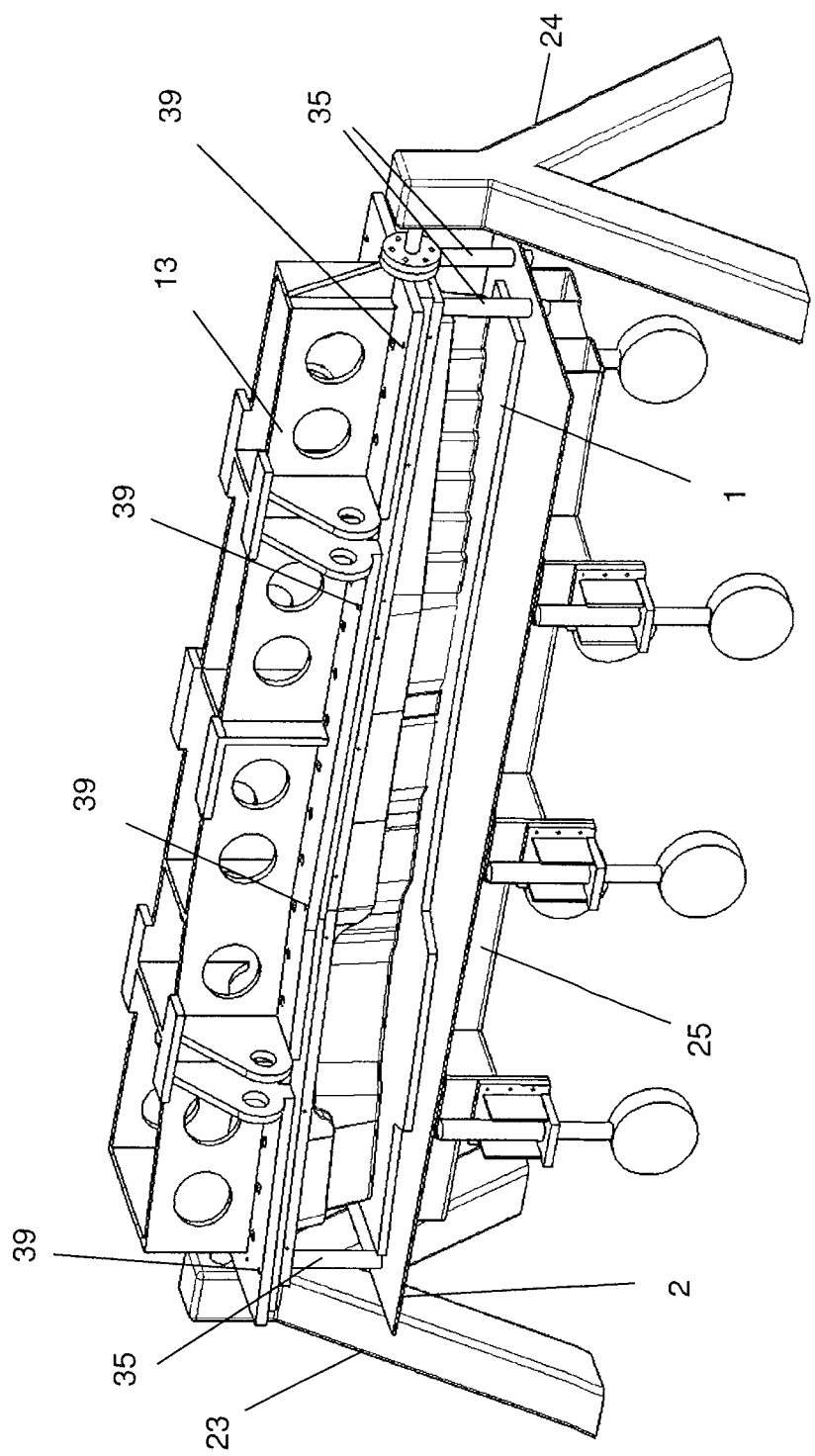
FIGS. 8 and 9 show the stack being lifted up into contact with the male tool.

After the rib posts and mandrels have been assembled, the transport trolley 25 is lowered and wheeled to one side. Next the support frame 13 is rotated by 180°. The lay-up table 2 carrying the stack 1 is then placed on the transport trolley 25, which is wheeled into position underneath the assembly as shown in FIG. 8.

Figure 9:
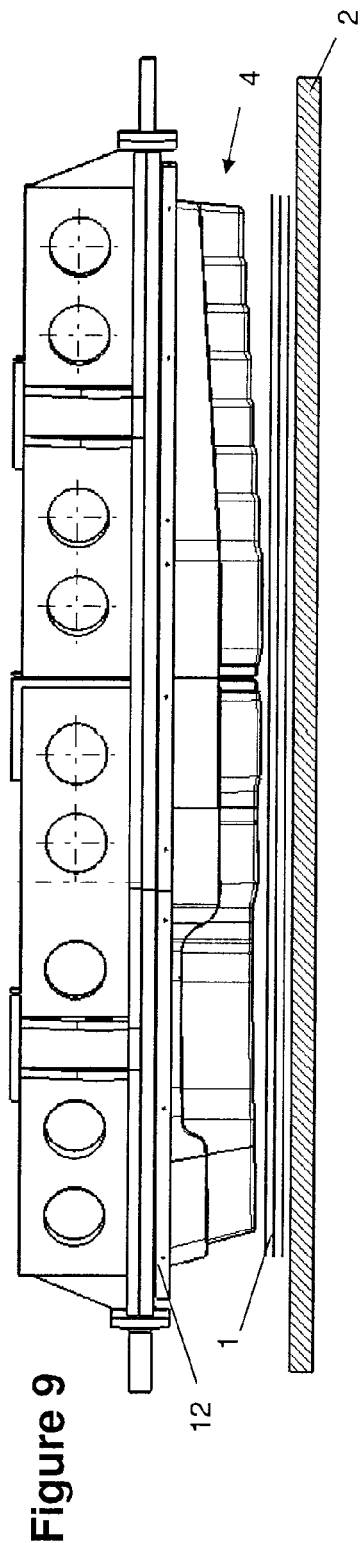

Pins 35 extending from the base plate 12 are inserted into location holes in the lay-up table to locate the lay-up table 2 precisely under the male tool. FIG. 9 is a side view showing the male tool 4 and lay-up table 2 from one side at this stage of the procedure but with the pins 35 not shown. The transport trolley 25 is then jacked up to press the stack 1 up against the tool 4 and the table 2 is bolted to the base plate 12 by threaded rods (not shown) which pass through holes 39 in the periphery of the support frame and holes (not shown) in the periphery of the lay-up table 2. The male tool 4 compresses only a central strip of the stack 1 as shown most clearly in FIG. 10, the strips on either side of the central strip remaining substantially uncompressed.

Figure 10:
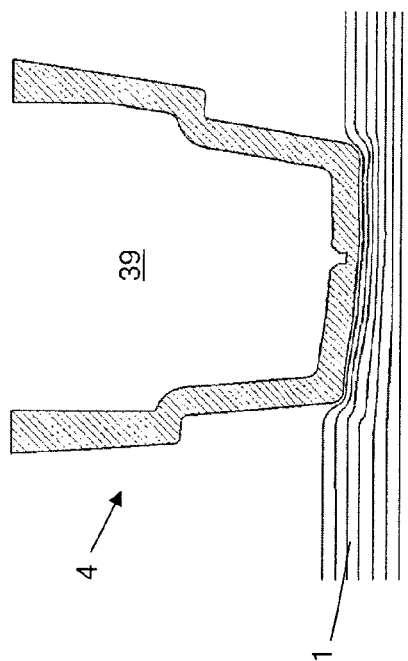
FIG. 10 shows a central strip of the stack being compressed by the male tool.
Figure 11:
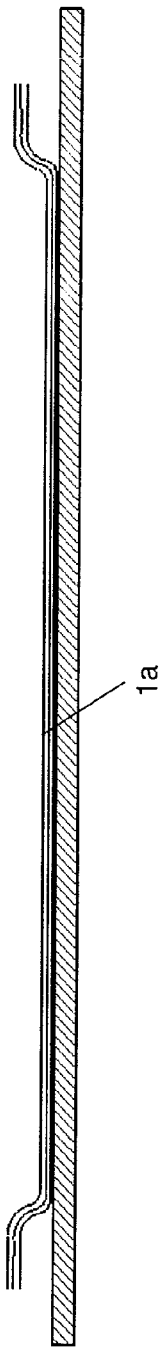
FIG. 11 is a sectional view showing the partially bound stack.
Figure 12:
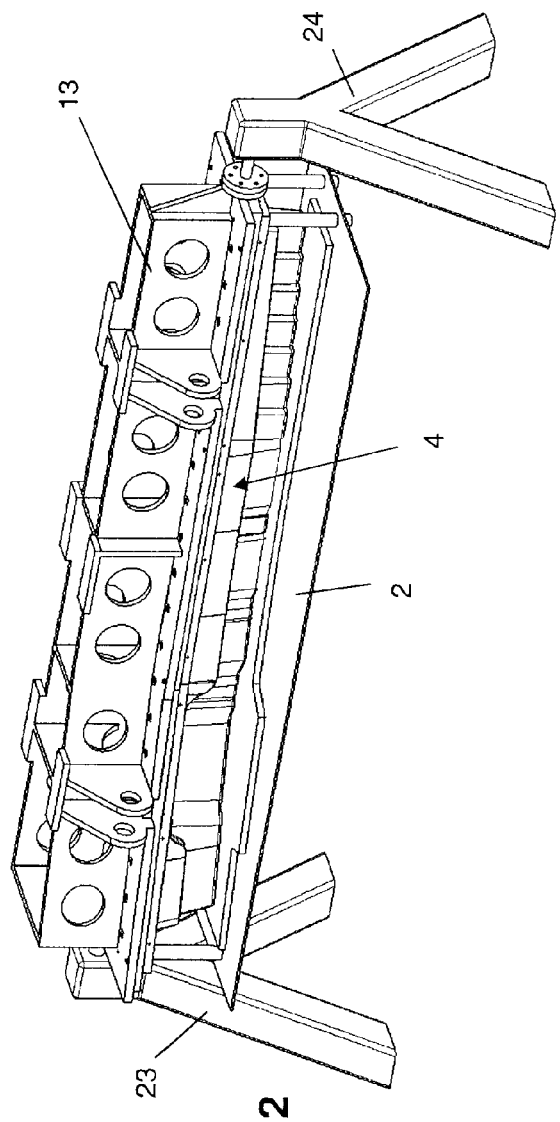
FIG. 12 shows the assembly after the trolley has been removed.

The mandrels are then heated to melt the binder in the central strip of the stack and form a bound stack of plies 1a shown in FIG. 11. Heating of the mandrels is performed by radiant heaters (not shown) in the cavity 39 shown in FIG. 10 between the mandrel and the base plate.

Plies in the strips on either side of the central strip are not bound and can still slide against each other. Although not shown in FIG. 11, the bound central strip also retains the shape of various features from the lower surface of the male tool.

Figure 13:
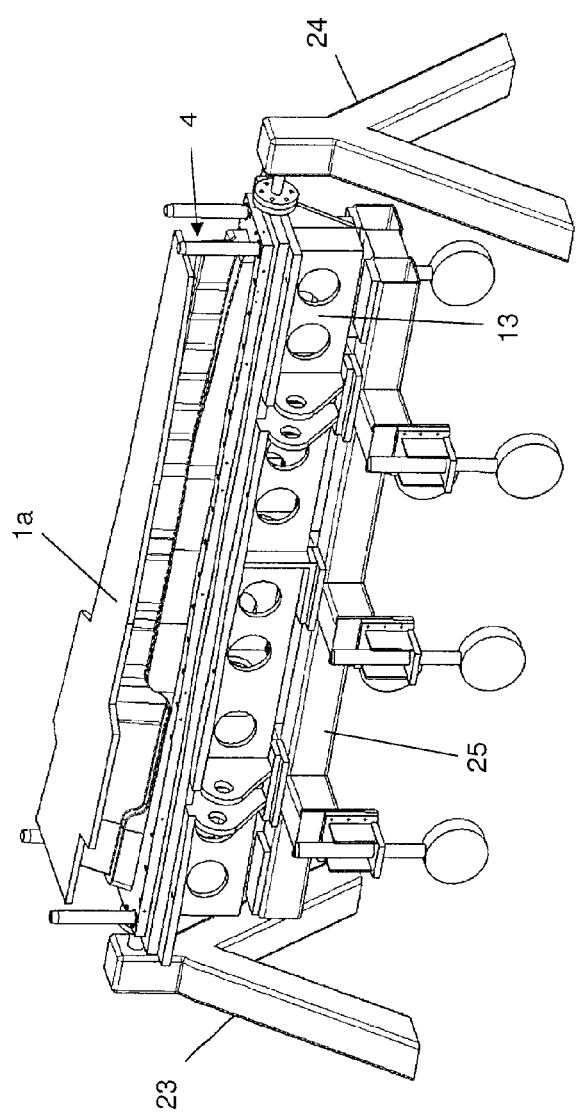
FIG. 13 shows the assembly after rotation and removal of the lay-up table.

Next the trolley 25 is lowered and removed (FIG. 12), the support frame 13 is rotated by 180°, the trolley 25 is moved back under the assembly and jacked up to lift the weight of the assembly from the A-frames 23, 24, and the lay-up table 2 is removed (FIG. 13).

Figure 14:
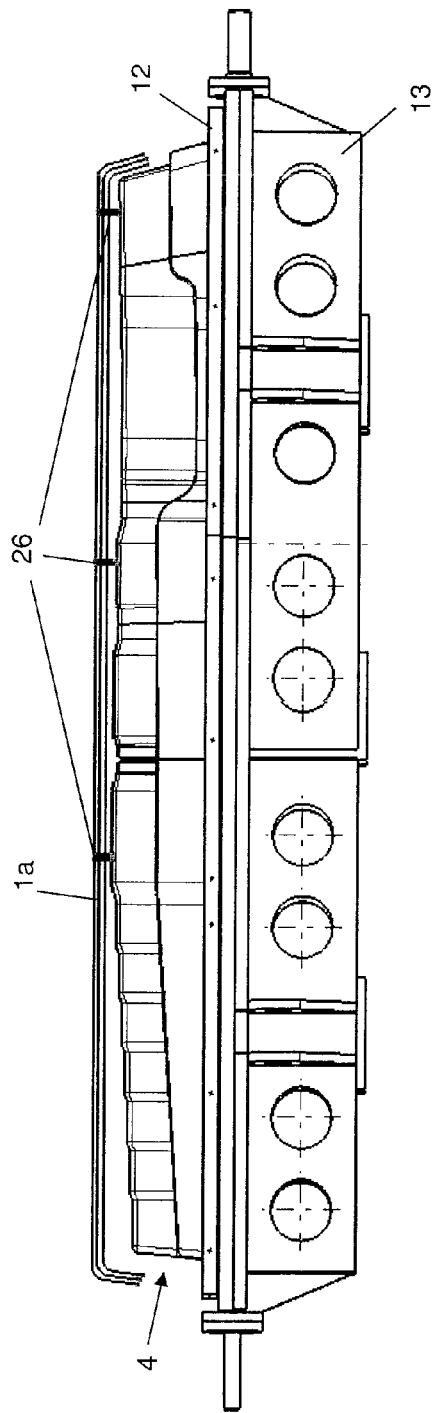
FIG. 14 is a side view of the male tool carrying the stack.

FIG. 14 is a side view of the male tool, base plate and support frame showing the bound stack 1a. As with FIG. 11, the bound stack 1a is shown schematically only, and in practice will follow the contours of the upper surface of the male tool along its length.

Figure 15:
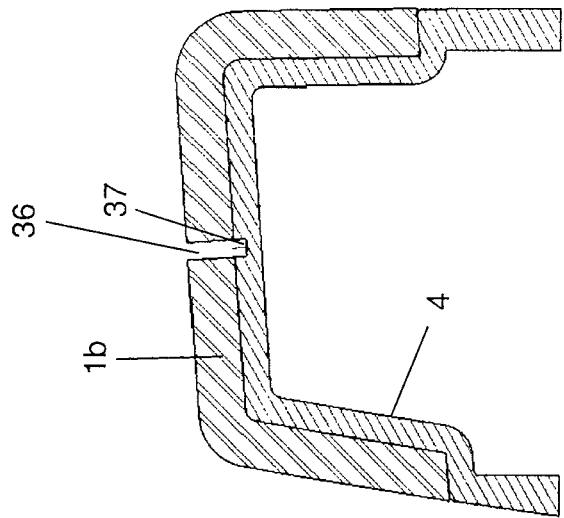
FIG. 15 is a sectional view through the male tool and shaped pre-form showing the holes which receive a guide pin.

At this point, guide pins 26 are inserted through various location holes along the length of the stack 11 and complementary location holes in the male tool 4. These location holes are not visible in FIG. 14 but are shown in FIGS. 15 at 36 and 37 (note that FIG. 15 is a cross-section through the stack and the tool after the pin 26 has been removed from the location holes 36, 37).

Figure 16:
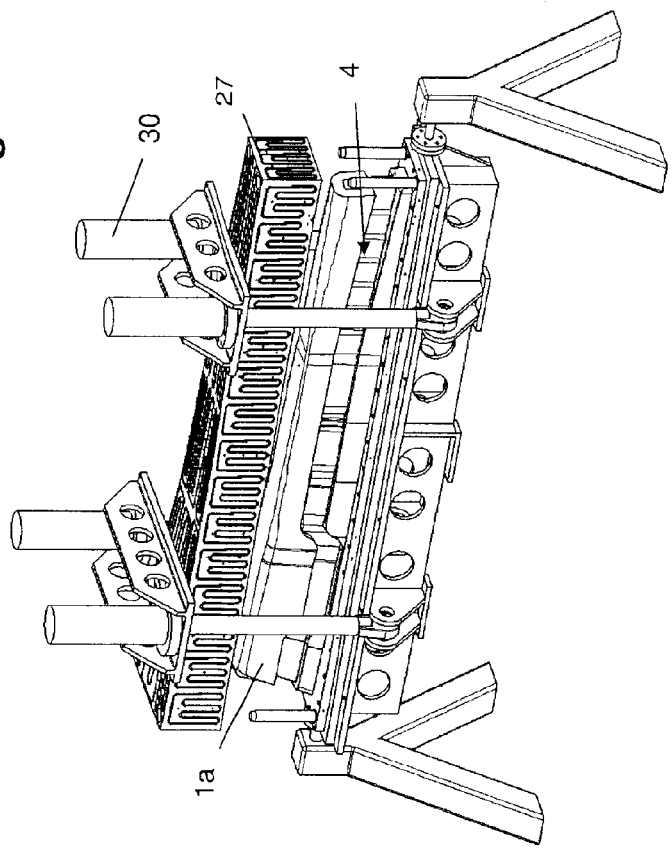
FIG. 16 shows the female tool being lowered into place.
Figure 17:
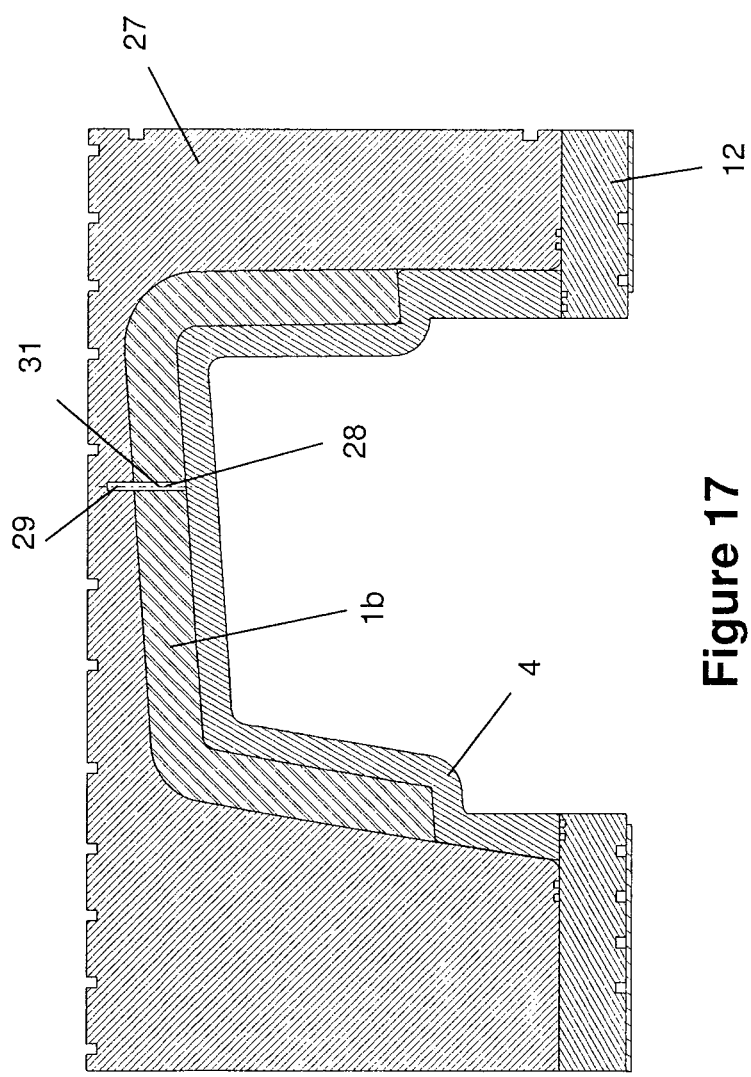
FIG. 17 is a sectional view showing the stack being press-formed.

After the lay-up table 2 has been removed, a female tool 27 is hoisted above the assembly and lowered from the position shown in FIG. 16 to the position shown in FIG. 17. Hydraulic actuators 30 apply a force of approximately 2 bar to close the tools together. This press-forms the bound stack of plies in the mould cavity between the male and female tools 4, 27 to form a net thickness C-section pre-form 1b as shown in FIG. 17.

The bound central strip of the pre-form forms the web of the spar, and the unbound parts on either side of the web are bent down by the action of the female tool to form the flanges of the spar. Plies in the unbound flanges slide against each other as they bend during the press-forming step. Preferably the curved radius regions where the flanges meet the web are also unbound so that the plies can slide against each other during press-forming.

The guide pins 26 in the bound web region ensure that the stack does not slide relative to the male tool during press-forming. Binding the web before press-forming also ensures that the plies in the web do not slide against each other during press-forming.

By allowing the plies in the flanges but not in the web to slide against each other during press-forming, wrinkling of plies is avoided or at least mitigated.

The female tool 27 carries a pair of datum pins, one at each end, each received as a push-fit in a respective hole in the female tool. One of such datum pins 28 is shown in FIG. 17 fitted into a hole 29 in the female tool. The datum pins 28 are inserted into pre-formed datum holes 31 in the bound central strip of the stack of plies as shown in FIG. 17.

Next, injection and bleeding ports (not shown) are connected to a supply of epoxy resin. The temperature of the pre-form is raised to 120° C. by electrical heating elements mounted on the exterior of the female tool, and by the radiant heaters in the male tool. Vacuum is applied to the mould cavity during heat up to remove any moisture from the pre-form. Then the liquid epoxy resin is injected through the injection ports into the mould cavity to infuse the pre-form and rib posts. After infusion, the tools are raised to 180° C. and the resin cures in approximately 2 hours.

Figure 18:
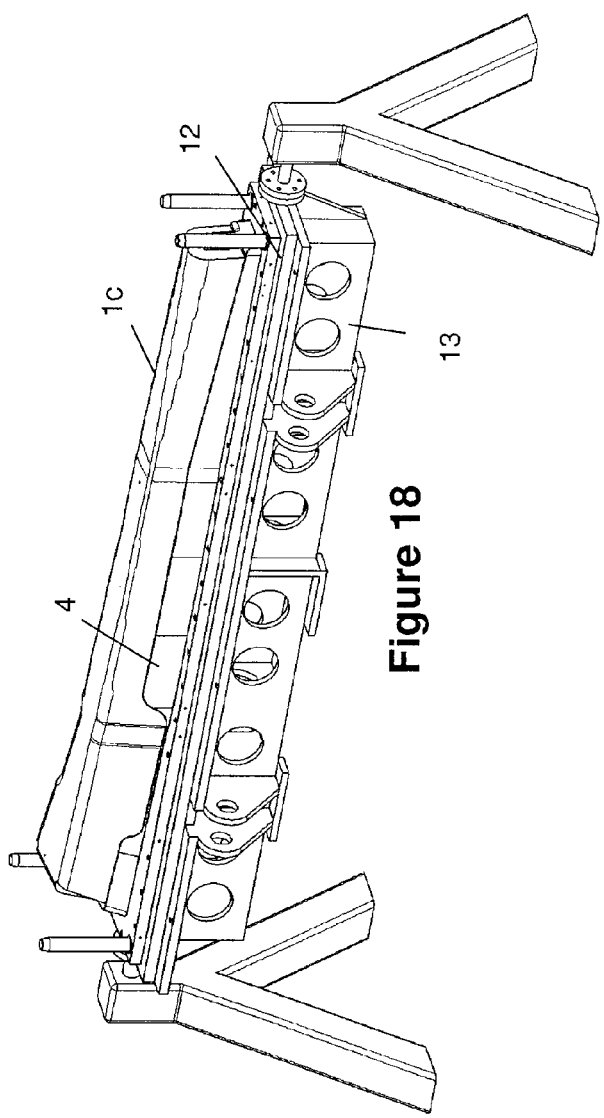
FIG. 18 shows the assembly after removal of the female mould tool.
Figure 19:
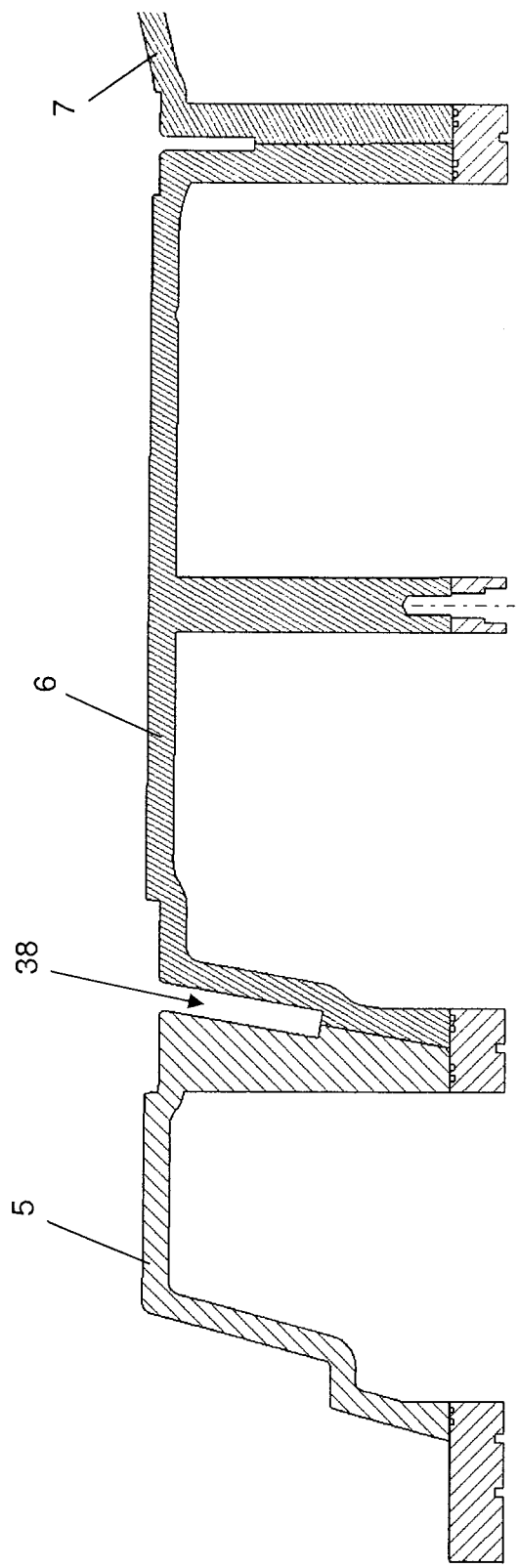
FIG. 19 is a sectional view of the base plate/male tool taken along a line A-A in FIG. 4.

Next the female tool is removed at 180° C. to reveal the cured spar 1c shown in FIG. 18. FIG. 19 is a cross-sectional view taken along a line A-A in FIG. 4. It can be seen from this drawing that the gap 38 between the mandrels 5,6 extends at a slight angle to the vertical. As a consequence, the blade of the rib post 17 which is received in this hole 38 prevents the spar 1c from being lifted off the male tool as the female tool is lifted off vertically.

Figure 20:
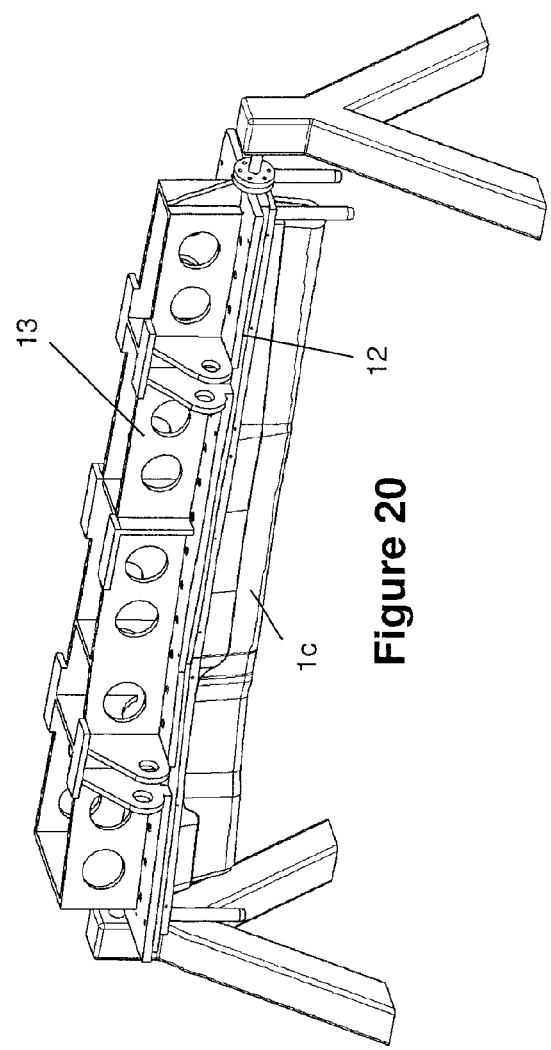
FIG. 20 shows the assembly after rotation.
Figure 21:
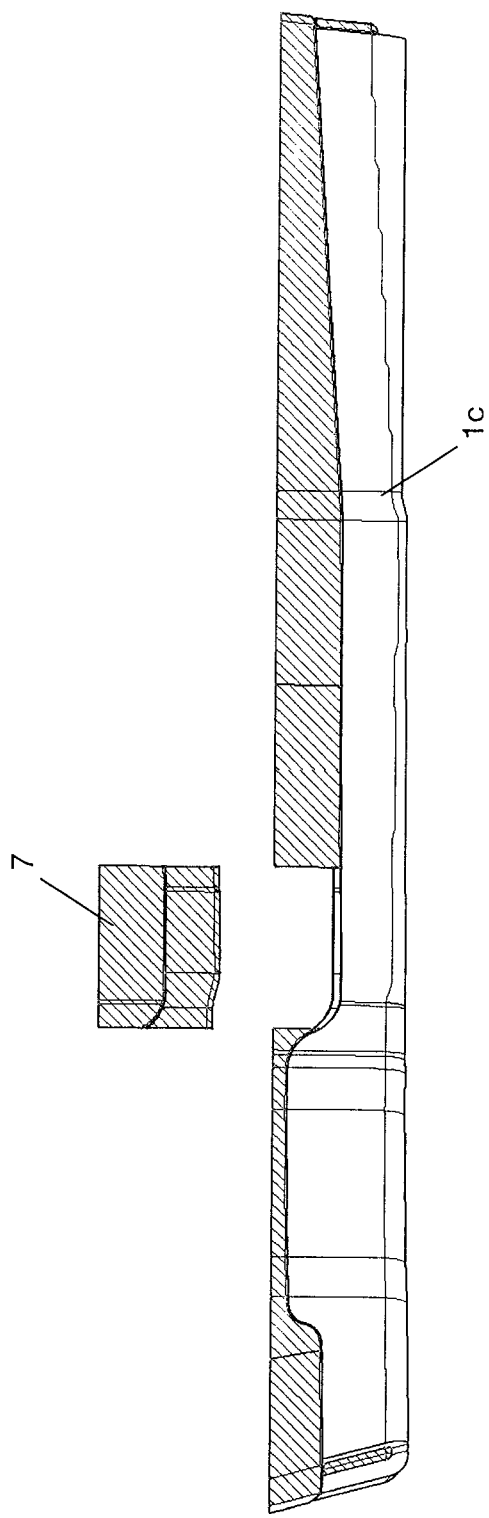
FIG. 21 shows one of the mandrels being removed.
Figure 22:
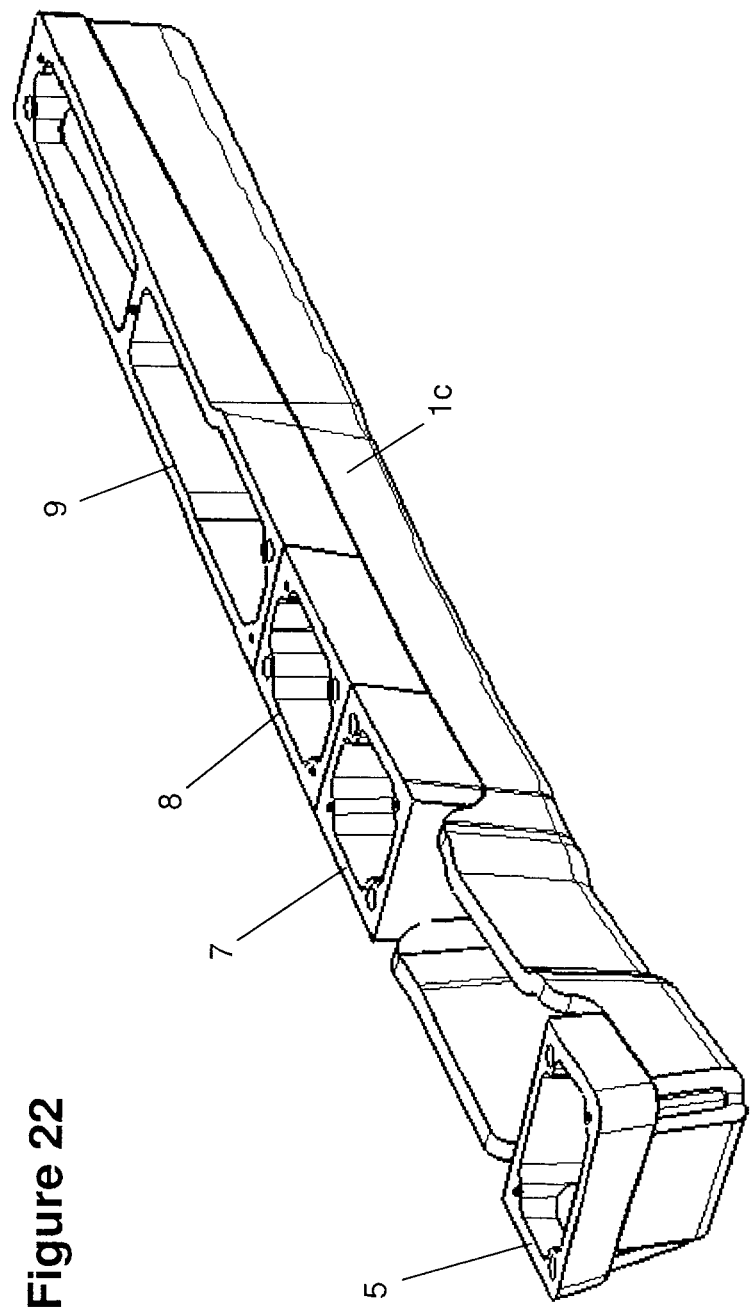
FIG. 22 shows the underside of the male tool with one of the mandrels removed.

A protective blanket (not shown) is then placed on top of the cured spar 1c and the support frame 13 is rotated 180° to the position shown in FIG. 20. The transport trolley 25 is brought back underneath and jacked up against the spar. The radiant heating elements in the male tool are disconnected. When the assembly has cooled down, first the base plate 12 is removed from the mandrels, and then the mandrels are removed one by one from the spar 1c in a predefined order. The order will depend on the exact geometry of the mandrels. FIG. 21 shows an example where mandrel 7 is being removed, and FIG. 22 shows an example where mandrel 6 has been removed. Alternatively the mandrels may be removed in the order 9,8,7,6.

FIGS. 23-25 show a method of binding and press-forming the stack which can be used as an alternative to the method shown in FIG. 10 which uses the lay-up table during the binding step. In this case the stack of unbound plies is carried on top of the male tool 4 as shown in FIG. 23. The plies are laid up on the flat lay-up table 2 and then transferred onto the male tool 4 using the same method as described above (that is, by positioning the stack under the male tool, then inverting both and removing the lay-up table). The female tool 27 carries a plate 40 with a projecting central strip 41. The female tool is brought down and the strip 41 presses the stack. The stack is heated by the male tool and the binder in the central strip 41 melts to form a bound stack shown in FIG. 24. The plate 40 is then removed and the female tool brought down as shown in FIG. 25 to press-form the bound stack.

FIGS. 26-32 show some of the initial steps of a further alternative method of manufacturing a composite rear spar.

Figure 26:
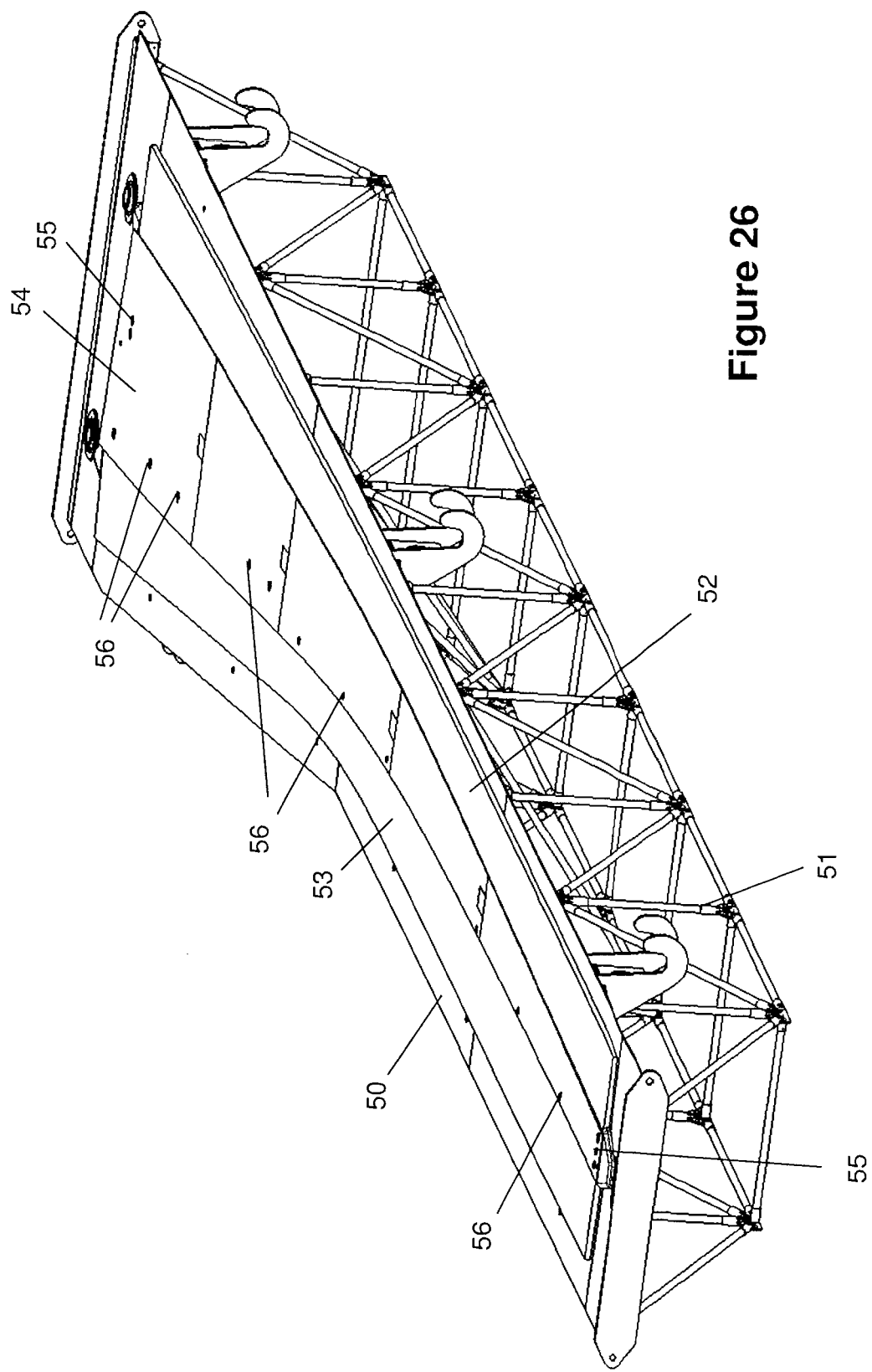
FIG. 26 shows a lay-up table carrying a row of heater mats.

FIG. 26 shows a lay-up table 50. The table 50 is mounted on a lightweight truss support structure 51. The table carries a pair of side mat strips 52, 53, and a row of five heater mats 54. The mats are all formed from the same material, but the heater mats 54 contain electrical heating elements (not shown) which are not present in the side mat strips 52, 53.

Figure 28:
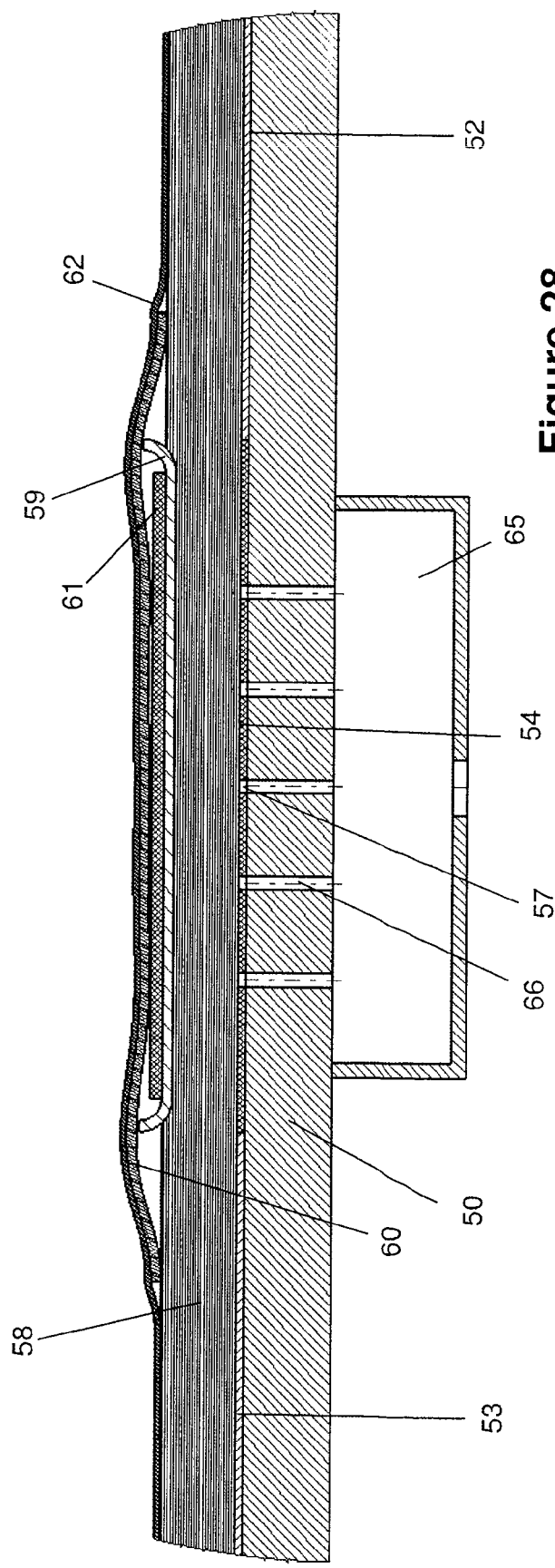
FIG. 28 is a close-up of the central part of FIG. 27.

The two heater mats 54 at each end of the row contain datum pin holes 55, and some of the heater mats contain location holes 56. The heater mats 54 also contain a regular array of small vacuum port holes. These are not shown in FIG. 26 but some are shown in FIG. 28 and indicated by reference number 57. Note that no vacuum port holes are present in the side mat strips 52, 53.

Figure 27:
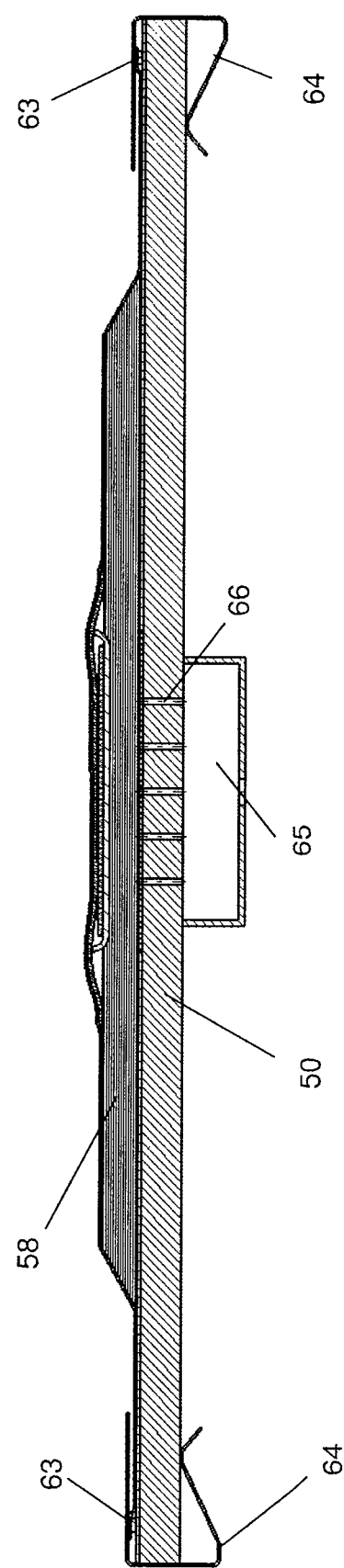
FIG. 27 is a cross-sectional view across the table after formation of the vacuum assembly.

A stack of plies 58 is laid onto the mats 52-54 as shown in FIGS. 27 and 28 (which are cross-sectional views across the table). Next a caul plate 59 is placed on the central part of the stack followed by a second row of five heater mats 60, a felt breather layer 61, and a vacuum bag 62. The vacuum bag 62 is sealed at its periphery against the strips 52,53 by sealing tape 63 and held in place against the table by G-clamps 64.

A vacuum chamber 65 under the lay-up table is then evacuated, forming a partial vacuum between the vacuum bag and the lay-up table via vacuum port holes 66 in the lay-up table and the vacuum port holes 57 in the heater mats 54. The mat strips 52, 53 and heater mats 54 are bonded to the lay-up table to ensure that there is an airtight seal. The vacuum bag 60 is sucked against the table as shown in FIGS. 27 and 28 and compresses the stack between the caul plate and the lay-up table. The heater mats 54 and 60 are then turned on to bind the central part of the stack.

Note that although not apparent from FIGS. 27 and 28, the bottom surface of the caul plate 59 is contoured to match the contour of the male tool 67. Note however that the width of the caul plate 59 is slightly less than the width of the male tool 67. This ensures that the curved radius regions where the flanges meet the web are unbound so that the plies can slide against each other during press-forming.

After the binding step, the vacuum is released, and the sealing tape 63, clamps 64, vacuum bag 62 and top heater mats 60 are removed. The caul plate 59 contains datum pin holes (not shown) and location holes (also not shown) in line with the holes 55, 56 in the heater mats 54. Datum pin holes and location holes (similar to the holes 31, 36 shown in FIGS. 15 and 17) are drilled into the bound stack through the holes in the caul plate 59 by a tube drill as described in co-pending patent application GB0807639.0, filed 28 Apr. 2008, file reference XA2833, the contents of which are incorporated herein by reference. This can be contrasted with the more laborious method used in the previous embodiment in which the holes are formed individually ply-by-ply prior to assembly.

Next the caul plate 59 is removed and the central part of the bound stack is clamped to the lay-up table by turning on the vacuum. The edges of the stack are clamped to the lay-up table by quick-release toggle clamps or by G-clamps similar to the G-clamps 64. The lay-up table is then inverted by a floor-mounted pillar stile turnover fixture and rotary actuator (not shown). The vacuum is maintained and the lay-up table carrying the bound stack is lowered onto the top of the male tool. The vacuum is then released and the lay-up table, carrying the heater mats, is removed.

The lay-up table 50 is made of a lightweight composite sandwich structure, and mounted on a lightweight truss frame 51 so that it can be easily inverted without distorting the stack.

At this point the process is at an equivalent stage to that shown in FIGS. 13 and 14 for the previous embodiment, and the subsequent steps up to and including cure are identical to the previous embodiment.

Figure 29:
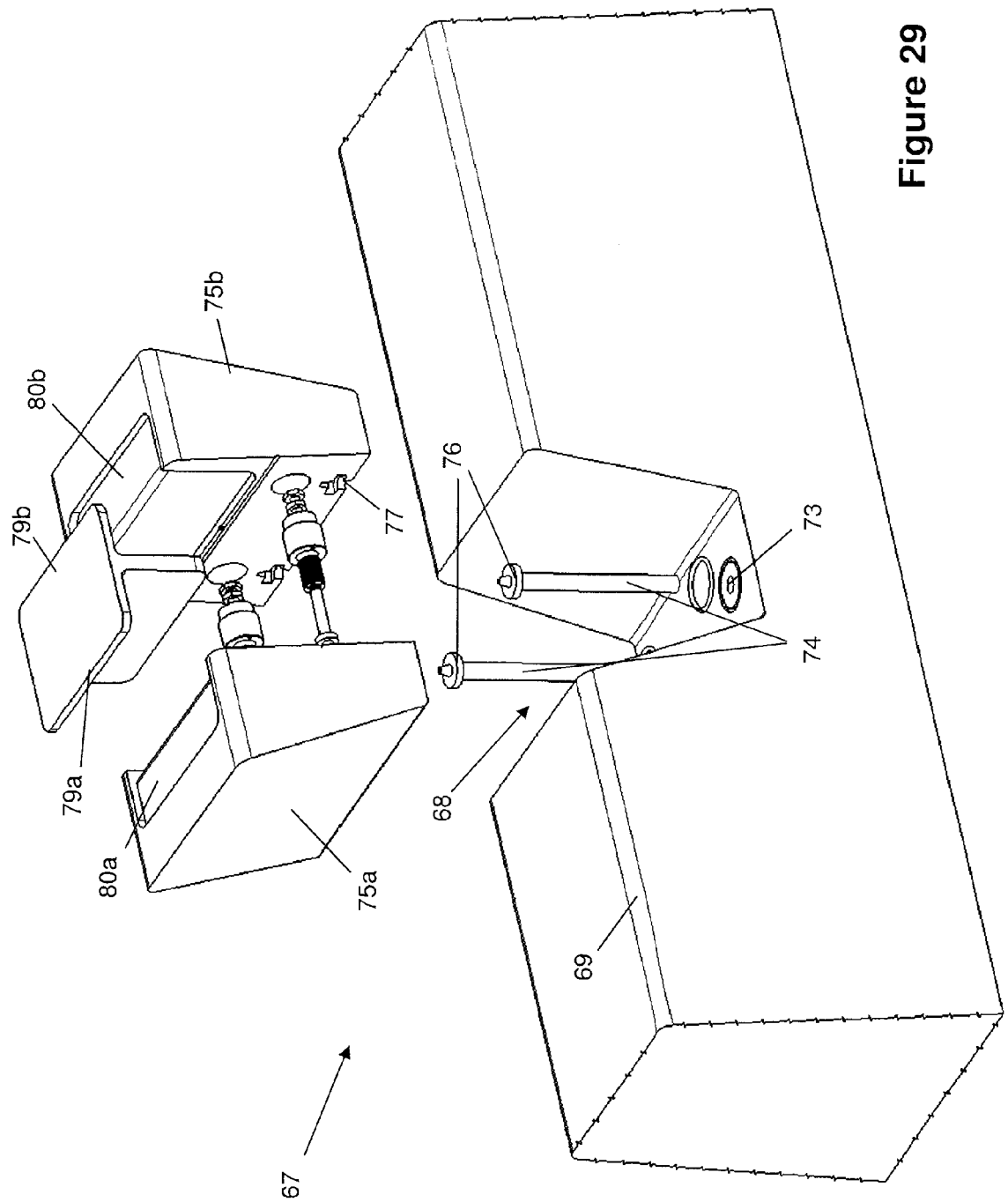
FIG. 29 is an exploded view showing part of a male tool and a cassette.
Figure 31B:
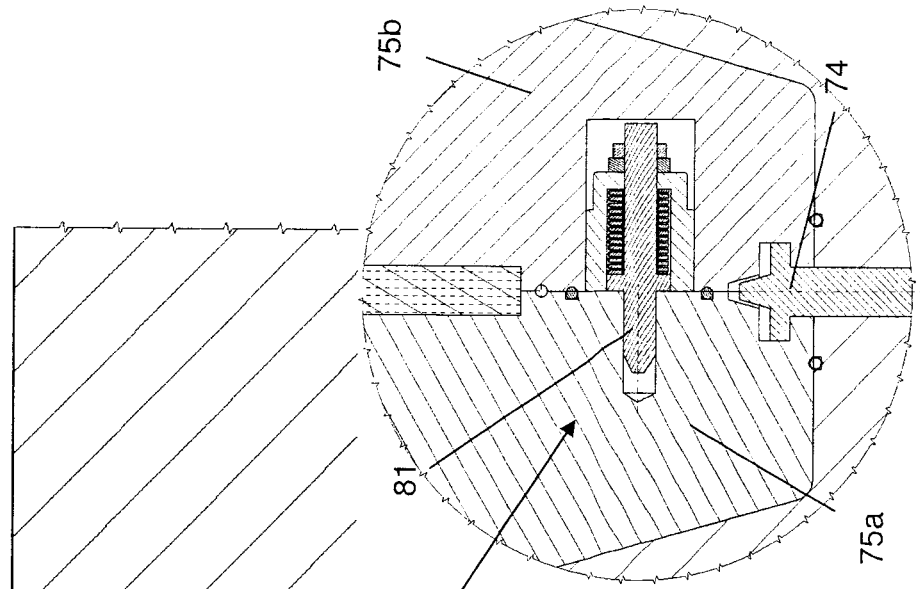
FIGS. 31a and b are sectional views through the male tool and cassette with the cassette carrying the rib post pre-form and pulled down into position.
Figure 31A:
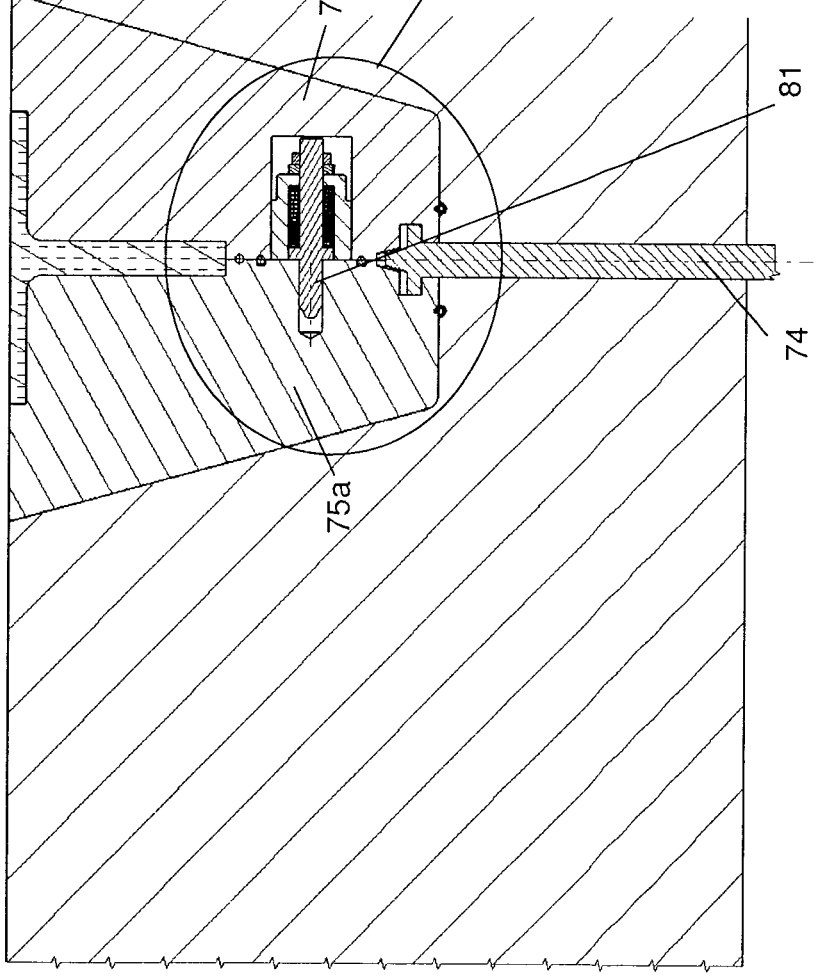
Figure 32:
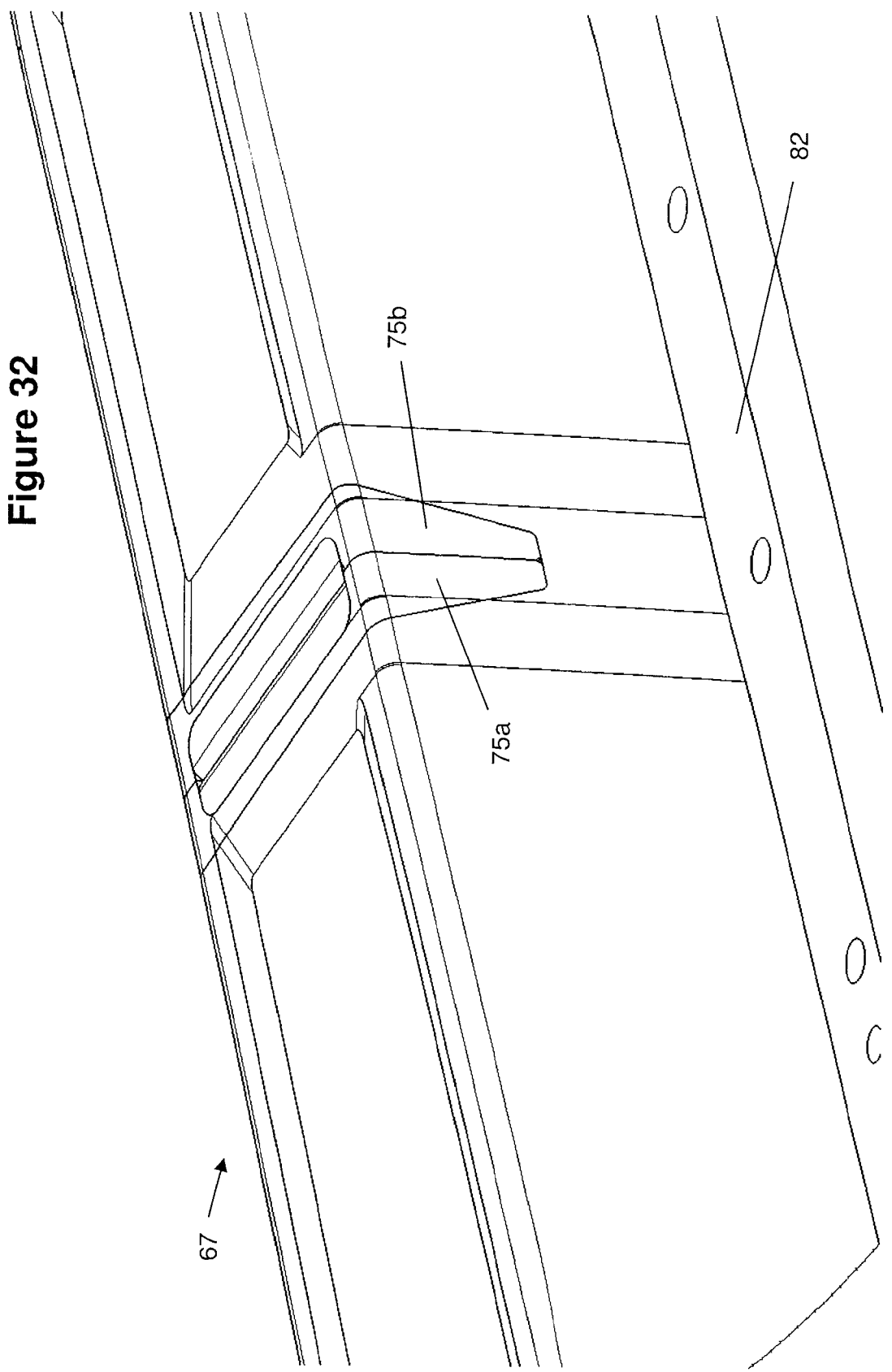
FIG. 32 is a perspective view showing the male tool and cassette with the cassette carrying the rib post pre-form and pulled down into position.

FIG. 29 shows part of a male tool 67 which can be used as an alternative to the male tool 4 described in the embodiment of FIGS. 1-22. The male tool 67 is formed as a single piece. The male tool 67 may be formed integrally with a base plate 82 shown in FIG. 32, or bolted to the base plate 82. The base plate 82 is not shown in FIG. 29.

The single-piece male tool 67 can be contrasted with the male tool 4 which is formed by a series of separate mandrels 5-9. However the outer profile of the male tool 67 is similar to that of the male tool 4, formed for instance with curved radius corners 69, ridges, depressions etc.

Male tool 67 is formed with a series of tapered recesses, one of such recesses 68 being shown in FIG. 29. At the base of each recess 68, a pair of hydraulic rams 74 are housed in holes 73. A pair of cassette halves 75*a*,*b* are brought together to form a cassette which is inserted into the recess 68 as shown in FIG. 30*a*. The rams 74 have disks 76 at their tips which are fitted into corresponding notches 77 in each of the two cassette halves 75*a*,*b*.

The rams are used to push the cassette halves up slightly to the position shown in FIGS. 30*a* and 30*b* The cassette halves are biased apart by a spring assembly 78 so as they are pushed up by the rams, they also part slightly so a gap opens up between them.

Next, a pair of L-shaped rib-post pre-forms 79*a*,*b*, formed as shown in FIGS. 7*a* and 7*b*, are laid into respective recesses 80*a*, *b* in respective cassette halves 75*a*,*b*. The cassettes halves and the rib post pre-forms are then pulled downwards by the pneumatic rams 74 via the engagement of the disks 76 with the lower faces of the notches 77. The cassette halves are forced together by the tapering walls of the recess 68 as they are pulled down against the biasing force of the spring assembly 78 to the position shown in FIGS. 31 and 32. The press-forming of the rib post pre-forms as described in FIGS. 7*a* and 7*b* achieves a certain degree of de-bulking, but further de-bulking may be required to achieve net thickness. In this case the closing together of the cassette halves further compresses the rib posts and finally de-bulks them to the desired net thickness. The spring assembly 78 has a guide pin 81 which maintains the alignment of the two halves of the rib post throughout this process.

The male tool 67 can then be used instead of the male tool 4 to bind the stack as shown in FIG. 10 or FIG. 23. Alternatively, the male tool 67 may be used in combination with the vacuum binding method shown in FIGS. 26-28.

After the female tool has been removed from the male tool 67 post-cure, the method of disengaging the cured spar from the male tool 67 is different to the method shown in FIGS. 21 and 22. In this case the cured spar is disengaged from the male tool 67 by the rams 74 which eject the cassettes from the recesses and push the spar off the male tool.

Although the invention has been described above with reference to one or more preferred embodiments, it will be appreciated that various changes or modifications may be made without departing from the scope of the invention as defined in the appended claims.

The invention claimed is:

1. A method of manufacturing a composite element, the method comprising:
   a. assembling a stack of plies on a lay-up table, each ply comprising a plurality of reinforcement elements;
   b. binding together a first part of the stack of plies to form a partially bound stack of plies, a second part of the stack of plies remaining unbound, wherein the binding comprises applying pressure to the first part of the stack of plies; and thereafter
   c. press-forming the partially bound stack of plies in a mould cavity between a pair of mould tools to form a shaped pre-form, plies in the second part of the stack sliding against each other during the press-forming;
   d. injecting a liquid matrix material into the shaped pre-form in the mould cavity; and
   e. curing the liquid matrix material.

2. The method of claim 1 wherein the binding step b. comprises heating the first part of the stack of plies to melt a binder.

3. The method of claim 1 wherein the binding step b. comprises applying pressure to the first part of the stack of plies with one of the mould tools which is subsequently used in the press-forming step c.

4. The method of claim 3 wherein the binding step b. is performed with the stack of plies on top of the lay-up table; and wherein the method further comprises inverting the lay-up table, the partially bound stack of plies and the mould tool between step b. and step c. so that the partially bound stack of plies are on top of the mould tool.

5. The method of claim 1 wherein the pair of mould tools comprise a male tool and a female tool and wherein the male tool comprises a series of mandrels which are removed individually after the liquid matrix material has cured in step e.

6. The method of claim 5 wherein the partially bound stack of plies is press-formed in step c. with the female mould tool positioned above the male mould tool; wherein the method further comprises removing the female mould tool after step c. and inverting the male mould tool and shaped pre-form so that the male tool is positioned above the shaped pre-form; and wherein the mandrels are removed from above the shaped pre-form after they have been inverted.

7. The method of claim 5 further comprising placing an additional component in a gap between a pair of the mandrels; injecting a liquid matrix material into the additional component in the gap between the pair of mandrels; and curing the liquid matrix material in the additional component.

8. The method of claim 1 further comprising inserting one or more pins, each pin being received in a respective hole in the partially bound stack of plies, the pin(s) remaining in place during the press-forming step c. and the injection step d.

9. The method of claim 1 wherein the binding step further comprises: placing a caul plate on the first part of the stack; laying a vacuum bag over the caul plate and stack; and forming a partial vacuum between the vacuum bag and the lay-up table in order to compress the stack between the caul plate and the lay-up table.

10. The method of claim 9 wherein the partial vacuum is formed via a plurality of vacuum ports in the lay-up table; wherein the vacuum ports are positioned adjacent to the first part of the stack; and wherein substantially no vacuum ports are positioned in the stack adjacent to the second part of the stack.

11. The method of claim 1 further comprising placing an additional component between two or more cassette parts to form a cassette; inserting the cassette into a recess in one of the tools; injecting a liquid matrix material into the additional component in the recess; and curing the liquid matrix material in the additional component.

12. The method of claim 11 further comprising ejecting the cassette from the recess as the pre-form is disengaged from the one of the tools after curing.

13. The method of claim 11 further comprising compressing the additional component between the cassette parts.

* * * * *

UNITED STATES PATENT AND TRADEMARK OFFICE
CERTIFICATE OF CORRECTION

| | | |
|---|---|---|
| PATENT NO. | : 8,911,650 B2 | Page 1 of 1 |
| APPLICATION NO. | : 13/054185 | |
| DATED | : December 16, 2014 | |
| INVENTOR(S) | : Simon W. Topping et al. | |

It is certified that error appears in the above-identified patent and that said Letters Patent is hereby corrected as shown below:

On the title page, Item 22 the PCT Filed information should read as follows:

PCT Filed: July 22, 2009

Signed and Sealed this
Twelfth Day of May, 2015

Michelle K. Lee
*Director of the United States Patent and Trademark Office*